United States Patent [19]
Vaia et al.

[11] Patent Number: 5,955,535
[45] Date of Patent: Sep. 21, 1999

[54] METHOD FOR PREPARING SILICATE-POLYMER COMPOSITE

[75] Inventors: Richard A. Vaia; Oliver K. Tse; Emmanuel P. Giannelis, all of Ithaca, N.Y.

[73] Assignee: Cornell Research Foundation, Inc., Ithaca, N.Y.

[21] Appl. No.: 08/158,249

[22] Filed: Nov. 29, 1993

[51] Int. Cl.$^6$ ............................. C08K 3/34; B32B 19/02
[52] U.S. Cl. .................. 524/791; 524/442; 524/443; 524/492; 524/493; 524/789; 523/209; 523/216; 428/407
[58] Field of Search .................... 523/216, 200, 523/205; 524/580, 606, 791, 442, 443, 789; 501/3, 4, 32; 428/407

[56] References Cited

U.S. PATENT DOCUMENTS

| | | | |
|---|---|---|---|
| 3,985,702 | 10/1976 | Himes | 523/167 |
| 4,414,142 | 11/1983 | Vogel et al. | 252/506 |
| 4,472,538 | 9/1984 | Kamigaito et al. | 428/407 |
| 4,739,007 | 4/1988 | Okada et al. | 524/789 |
| 4,789,403 | 12/1988 | Rice | 523/205 |
| 4,810,734 | 3/1989 | Kawasumi et al. | 523/216 |
| 4,868,247 | 9/1989 | Lehr | 525/239 |
| 4,889,885 | 12/1989 | Usuki et al. | 524/791 |
| 4,894,411 | 1/1990 | Okada et al. | 524/710 |
| 5,032,546 | 7/1991 | Giannelis et al. | 501/3 |
| 5,032,547 | 7/1991 | Giannelis et al. | 501/3 |
| 5,037,876 | 8/1991 | Birkle et al. | 524/496 |
| 5,073,412 | 12/1991 | Gaier | 427/294 |
| 5,300,464 | 4/1994 | Rittler | 501/32 |
| 5,385,776 | 1/1995 | Maxfield et al. | 524/789 |

OTHER PUBLICATIONS

Aranda, P., et al., Chemical Abstracts, 117:122183s (Sep. 1992).
Vaia, R. A., et al., Chemical Abstracts, 120:9627p (Jan. 1994).
Aranda, P., et al, Chem. Mater., 4, 1395–1403 (1992).
Fukushima, Y., et al, Clay Min., 23, 27–34 (1991).
Giannelis, E.P., et al, in Synthesis and Processing of Ceramics: Scientific Issues, Rhine, W.B., et al, eds., Materials Res. Soc. Symp. Proc., 249, 547–558 (1992).
Kato, C., et al, Clay and Clay Minerals, vol. 29, No. 4, 294–298 (1981).
Mehrotra, V., et al, in "Polymer Based Molecular Composites", Shaeffer, D.W., et al, eds., Mat. Res. Soc. Symp. Proc. 171, 39–44 (1990).
Mehrotra, V., et al, Solid State Communications, 77, No. 2, 155–158 (1991).
Mehrotra, V., et al, Chem. Mater. 3, 898–902 (1991).
Mehrotra, V., et al, Solid State Ionics 51, 115–122 (1992).
Ogawa, M., Clay Science 7, 243–251 (1989).
Theng, B.K.G., Formation and Properties of Clay–Polymer Complexes, 65–73, 90–94, Elsevier Scientific Publishing Company, New York 1979.

*Primary Examiner*—Tae Yoon

[57] ABSTRACT

Polymer (e.g., poly(ethylene oxide) or polystyrene is intercalated into galleries of 2:1 layered silicate in the absence of solvent to provide composite where the polymer does not demonstrate melting or glass transition. In a variation, polymer (e.g., polyamide) matrix containing layers of silicate of height less than 1 nanometer is produced by delaminating layers of silicate during the intercalation.

13 Claims, No Drawings

METHOD FOR PREPARING SILICATE-POLYMER COMPOSITE

This invention was made at least in part under Nuclear Detection Systems Engineering Grant No. N00014 89 J3186 and under Office of Naval Research Grant No. N00014 90 J1778. The United States Government has certain rights to this invention.

TECHNICAL FIELD

This invention relates to a method of making a silicate-polymer composite material with better processability than the silicate and higher mechanical strength and better high-temperature characteristics than the polymer.

BACKGROUND OF THE INVENTION

Known methods of making silicate-polymer composites involve forming polymer in situ and/or carrying out intercalation utilizing a solvent. See, for example, Okada et al U.S. Pat. No. 4,739,007; Okada et al U.S. Pat. No. 4,849,411; Kawasumi et al et al U.S. Pat. No. 4,810,734; Giannelis et al U.S. Pat. No. 5,032,546; and Giannelis et al U.S. Pat. No. 5,032,547.

SUMMARY OF THE INVENTION

The process of the invention herein produces silicate-polymer composites in a solvent-free process and without in situ formation of the polymer. This process provides less expensive and environmentally safer synthetic pathways to produce known silicate-polymer composites and also makes possible production of silicate-polymer composites for which suitable processing solvents do not exist.

The method herein comprises the steps of forming a solvent-free admixture of (a) 2:1 layered gallery-containing crystalline silicate having charge-balancing cation selected from the group consisting of sodium ion, potassium ion, lithium ion, calcium ion, magnesium ion and organic cation and (ii) polymer, in a weight ratio of silicate to polymer ranging from 1:1000 to 100:1, and (b) reacting the silicate and the polymer in said admixture to cause the intercalation of the polymer into the galleries of the silicate, e.g., by heating said admixture in air or vacuum at above the melting or glass transition temperature of the polymer.

A first embodiment involves intercalating polymer in layer(s) of heights of less than 1 nanometer into a matrix of the silicate to produce composites which show no melting or glass transition and which are therefore dimensionally stable. This is carried out without causing delamination of the layers defining the galleries of the silicate into which the polymer intercalates; this is accomplished by carrying out step (b) in the substantial absence of shear forces.

In one example of this embodiment, the silicate is sodium montmorillonite and the polymer is crystalline poly(ethylene oxide) having a molecular weight ranging from 1000 to 1,000,000, in one alternative ranging from 5,000 to 150,000, and the weight ratio of silicate to polymer ranges from 10:1 to 1.5:1.

In another example of this embodiment, the silicate is quaternary ammonium montmorillonite wherein the quaternary ammonium moiety contains at least one organophilic group and the polymer is amorphous polystyrene having a molecular weight ranging from 1,000 to 1,000,000, in one alternative ranging from 25,000 to 500,000, and the weight ratio of silicate to polymer ranges from 10:1 to 1.5:1.

A second embodiment involves carrying out step (b) under conditions which cause delamination of layers defining the galleries of the silicate into which the polymer intercalates, e.g., by subjecting the admixture of silicate and polymer to shear forces during step (b). This produces a composite containing layers of silicate which are delaminated from the crystal structure of the silicate starting material. In one alternative of this embodiment, the weight ratio of silicate to polymer is such that a composite is produced comprising a polymer matrix containing layers of silicate of height of less than 1 nanometer; a weight ratio of silicate to polymer of 1:200 to 1.5:1 provides a preferred product of this type.

The term "solvent-free" is used herein to mean that solvent is not used as a carrier for the polymer. It does not exclude the water which may normally be contained in the silicates.

DETAILED DESCRIPTION

We turn firstly to the polymer. It can be either thermoplastic or thermosetting. Thermoplastic polymers are preferred. Examples of thermoplastic polymers include vinyl polymers (e.g., polystyrene, polyethylene, polypropylene, ethylene-propylene diene monomer polymers, acrylonitrile-styrene-butadiene copolymers and rubber), polyalkylene oxides (e.g., poly(ethylene oxide)), polyamides (e.g., nylons, such as nylon-6 (polycaprolactam), nylon-66 (poly(hexamethylene adipamide)), nylon-11, nylon-12, nylon-46, nylon-7, or nylon-8), polyesters (e.g., polyethylene terephthalate and polybutylene terephthalate), vinylidene polymers (e.g., poly(vinylidene fluoride) and poly(vinylidene chloride)), fluoropolymers (e.g., polytetrafluorethylene and polychlorotrifluoroethylene), polysiloxanes (e.g., polydimethylsiloxanes), polyphenylene sulfides, polyacetals, polycarbonates, polysulfones and polyether sulfones. Examples of thermosetting resins are phenolic resins, epoxy resins, unsaturated polyester resins, alkyd resins, furan resins, urea resins, melamine resins, polyurethane resins and aniline resins.

We turn now to the 2:1 layered gallery-containing silicates. The term "2:1 layered silicates" is a known term and describes silicates containing lattice layers containing two tetrahedral sheets that share an edge with an octahedral sheet of either aluminum or magnesium hydroxide. The stacking of the layers provides interlayers or galleries between the layers. The galleries are normally occupied by cations that balance the charge deficiency that is generated by the isomorphous substitution within the layers. Besides the charge-balancing cations, water is also present in the galleries where it tends to associate with the cations. The silicates are referred to as gallery-containing to describe this characteristic of 2:1 layered silicates, to provide antecedent basis for recitation in step (b) of intercalation of polymers into the galleries of the silicate. The silicates may be either natural or synthetic. The natural silicates include, for example, smectite clay minerals (e.g., montmorillonite, saponite, beidellite, nontronite, hectorite and stevensite), vermiculite and halloysite. The synthetic silicates include, for example, laponite, fluorhectorite, hydroxyl hectorite, boron fluophlogopite, hydroxyl boron phlogopite, and solid solutions among those and between those and structurally-compatible natural silicates selected from the group consisting of talc, fluortalc, polylithionite, fluorpolylithionite, phlogapite, and fluorphlogopite. These normally are associated with, i.e., in the pristine state contain, charge balancing cations selected from the group consisting of sodium ions, potassium ions, lithium ions, calcium ions and magnesium ions. In the case of polymers which do not contain hydrophilic moiety, intercalation is not obtained when the charge balancing cations are those normally present in the pristine state of the silicate, i.e., sodium ions, potassium ions, lithium ions, calcium ions or magnesium ions. In this case, the charge-balancing cation must at least partly be organic cation with at least one organophilic group for intercalation to be obtained. The pristine silicates are readily modified to contain such organic cation by ion exchange, e.g., as taught in the Okada et al and Kawasumi et al patents. Suitable organic cations include, for example, substituted ammonium ions, e.g., octadecyl dimethyl ammonium ion or dodecylammonium ion or other mono or di $C_8-C_{18}$ alkylammonium ion or where substitution is by —R—COOH wherein R denotes an alkylene group which may contain phenylene, vinylene, branching and/or other linkages, e.g., 12-aminododecanoic acid ion, or orgabophosphonium ions, e.g., $C_8-C_{18}$ alkylphosponium ion, or organosulfonium ions, e.g., $C_8-C_{18}$ alkylsulfonium ions As indicated above, the weight ratio of silicate to polymer in the admixture of step (a) ranges from 1:1000 to 100:1. In the embodiment where the polymer is intercalated in layer (s) of height less than 1 nanometer into a matrix of silicate, the ratio of silicate to polymer preferably ranges from 10:1 to 1.5:1 and very preferably ranges from 2:1 to 3:1. In the embodiment involving producing a polymer matrix containing layers of silicate of height less than a nanometer, the weight ratio of silicate to polymer preferably ranges from 1:200 to 1.5:1 and very preferably ranges 1:3 to 1:10.

The polymer and silicate are used in step (a) in the form of dry powders. In general, the polymer normally has particle size of 0.01 micron to 1 centimeter and the silicate has particle size ranging from 0.01 to 25 microns. These particle sizes refer to the largest dimension of the particles.

The admixture of step (a) is readily formed by any technique that succeeds in mixing dry powders, e.g., using a mortar and pestle or ball milling.

It is preferred that step (a) also include cold pressing of the mixture of dry powders to compress the polymer and silicate particles together, e.g., by uniaxially pressing, e.g., at a pressure of 2000 to 6000 lbs/in$^2$. This provides better contact between the polymer and silicate to reduce the reaction time in step (b).

We turn now to step (b). This is carried out under conditions to cause the intercalation of polymer into the galleries of the silicate. When the polymer used is in crystalline form, then the temperature used in step (b) should be greater than the melting point of the polymer. When the polymer used is in amorphous form, then the temperature used in step (b) should be greater than the glass transition temperature of the polymer. The temperature used should be below the decomposition point of the polymer. Step (b) may be carried out in air if the intercalation can be obtained at a temperature below the decomposition point of the polymer for the time period selected. Otherwise step (b) should be carried out under vacuum. Typically, intercalation is completed in a period of 0.5 hours to 50 hours. Use of dynamic condition (mixing) during step (b) decreases the temperature and/or time required for intercalation. For the poly(ethylene oxide) mentioned above, suitable static conditions (no mixing) include heating at a rate of 0.1 to 10° C./min. to 60 to 80° C. and maintaining that temperature for 0.5 to 6 hours, in air. For the polystyrenes mentioned, suitable static conditions (no mixing) include heating at a rate of 0.1 to 10° C. /min. to 100 to 175° C. and maintaining that temperature for 0.5 to 24 hours, under vacuum.

The intercalated polymers adopt a collapsed conformation (the polymer chains are extended and not in their usual coiled conformation) and show no melting or glass transition. This behavior is qualitatively different from that exhibited by bulk polymers and is attributed to the confinement of the polymer chains in the host galleries.

Furthermore crystallization is suppressed in intercalated polymers for polymers with a tendency to crystallizing in the bulk. The confined polymer exhibits dimensional stability.

We turn now to the variation in step (b) for the embodiment involving conditions which cause delamination of layers defining the galleries of the silicate into which the polymer intercalates. This can be carried out by applying shear forces to the admixture of silicate and polymer reacting in step (b), e.g., by carrying out step (b) in apparatus which generates shear, e.g., a commercial extruder (so as to carry out step (b) while extruding the admixture being reacted).

The invention is illustrated in the following examples.

EXAMPLE I

Mechanical mixing of 0.28 g of crystalline poly(ethylene oxide) having a molecular weight of 100,000 and obtained from PolySciences and 0.72 g of Na-montmorillonite was carried out using a mortar and pestle. The resulting admixture contains montmorillonite particles of size less than 2 microns. The resulting admixture was cold pressed (2 tons of load applied uniaxially for 2 seconds) into a pellet (diameter of 1 cm and height of 0.5 cm). The pellet was heated to 80° C. in air in a static oven and maintained at this temperature, in one case for two hours and in a second case for 6 hours. No solvent was used in the processing.

The X-ray diffraction pattern of a pellet before any heating contains peaks characteristic of both unintercalated layered silicate (d=10.6 angstroms) and the crystalline poly (ethylene oxide), i.e., d=4.61 angstroms. On heating at 80° C., the intensity of the peaks corresponding to the unintercalated silicate and crystalline poly(ethylene oxide) is progressively reduced while a new set of peaks appears corresponding to the poly(ethylene oxide)-intercalated silicate. At 6 hours, only diffractions corresponding to the poly(ethylene oxide)-intercalated silicate are observed signifying the completion of intercalation. The primary repeat unit (d-spacing) of 17.7 angstroms is identical to that obtained by intercalation from solution. The resulting gallery height of 8.2 angstroms corresponds to a monolayer of almost collapsed chains (i.e., the polymer chains are extended and not in their usual coiled condition).

The infrared spectrum of the intercalated sample contains absorptions characteristic of poly(ethylene oxide) superimposed on those from the layered silicate. In contrast to the spectrum for bulk poly(ethylene oxide), the band at approximately 2900 cm$^{-1}$, attributed to the polymer C-H stretching, splits into a doublet at 2910 and at 2878 cm$^{-1}$ in the spectrum for intercalated polymer. Similar behavior was observed for poly(ethylene oxide)-intercalated montmorillonite obtained by solution-assisted intercalation and is attributed to polymer-host interactions.

Differential scanning calorimetry shows a distinct melting transition at 0 and 2 hours but not at 6 hours. As the intercalation reaction progresses, the area of the endotherm corresponding to the melting of crystalline poly(ethylene oxide) is reduced. By six hours, the transition has largely vanished. A shallow hump in the 6-hour trace is most likely due to the small fraction of crystalline polymer adsorbed on the external surfaces of the host particles. Furthermore, the differential scanning colorimetry shows that as intercalation progresses, melting transition is shifted to lower temperatures.

The completely intercalated product is a coherent body and is useful as a polymer electrolyte in batteries.

Reference Example I

Mixtures of polystyrene (Mw of 35,000 and Mw/Mn of 1.06 and Mw of 400,000 and Mw/Mn of 1.06, obtained from Pressure Chemicals), 6.25 g, and Na-montmorillonite, 0.75 g, showed no sign of intercalation at temperatures as high as 175° C. in vacuum as judged by X-ray diffraction.

EXAMPLE II

Mechanical mixing of 0.25 g of amorphous polystyrene (Mw of 35,000 and Mw/Mn of 1.06, obtained from Pressure Chemicals) and 0.75 g of dioctadecyldimethylammonium montmorillonite was carried out with a mortar and pestle. The dioctadecyldimethylammonium montmorillonite was obtained by a cation exchange reaction between Na-montmorillonite and dioctadecyldimethylammonium bromide (from Kodak Chemical).

The resulting admixture contains montmorillonite particles of size less than 2 microns.

The resulting admixture was cold pressed (2 tons of load applied uniaxially for 2 seconds) into a pellet (diameter of 1 cm and height of 0.5 cm). The pellet was heated to 175° C. in vacuum (degree of vacuum=0.1 torr.) in an oven and maintained at this temperature without mixing for 17 hours. No solvent was used in the processing.

The X-ray diffraction pattern of the pellet show intercalation is complete by 17 hours. The resulting repeat unit and gallery height increase of 31 and 7 angstroms, respectively, correspond to a monolayer of fully-collapsed polymer chains (i.e., polymer chains fully extended and not in their normal coiled conformation).

Differential scanning calorimetry shows the characteristic glass transition at 96° C. for pure polymer and the physical mixture of polymer and silicate. The intercalated hybrid does not show a glass transition temperature. A shallow hump in the intercalated samples trace is attributed to the small fraction of the polymer adsorbed on the external surfaces of the host layers.

The intercalated product is a coherent body and is useful for electrical insulating purposes.

EXAMPLE III

An experiment was carried out as in Example II except that the polystyrene was amorphous polystyrene having a Mw of 400,000 and Mw/Mn of 1.06, obtained from Pressure Chemicals and heating was carried out for 24 hours.

The X-ray diffraction pattern shows the presence of polystyrene-intercalated montmorillonite and of pure organosilicate.

EXAMPLE IV

Polycaprolactam (Nylon-6) is admixed with dioctadecyldimethylammonium montmorillonite in a ball mill in a weight ratio of polycaprolactam to montmorillonite of 4:1.

This admixture is added into a commercial extruder wherein it is maintained at 230° C. under vacuum and is extruded from the apparatus at 10 gms/sec.

No solvent is used in the processing.

The product is a composite comprising polyamide matrix containing layers of silicate of height less than 1 nanometer.

Many variations of inventive embodiments will be obvious to those skilled in the art. Thus, the inventive embodiments are defined by the claims.

What is claimed is:

1. Method for preparing a composite material, said method comprising the steps of (a) forming a solvent-free admixture of (i) 2:1 layered gallery-containing crystalline silicate containing cation selected from the group consisting of sodium ion, potassium ion, lithium ion, calcium ion, magnesium ion and organic cation and (ii) polymer, in a weight ratio of the silicate to the polymer ranging from 1.5:1 to 100:1, (b) reacting the silicate and the polymer in said admixture to cause the intercalation of the polymer into the galleries of the silicate.

2. The method of claim 1 wherein the reaction of step (b) is effected by heating said admixture in air or vacuum at above the melting or glass transition temperature of the polymer.

3. Method as recited in claim 2 wherein the silicate is a montmorillonite containing cation selected from the group consisting of sodium ion, potassium ion, lithium ion, calcium ion and organic cation and the polymer is crystalline poly(ethylene oxide) having a weight average molecular weight ranging from 1,000 to 1,000,000 and the weight ratio of the silicate to the polymer ranges from 1.5:1 to 10:1.

4. Method as recited in claim 2 wherein the silicate is a quaternary ammonium montmorillonite having at least one organophilic group and the polymer is amorphous polystyrene having a weight average molecular weight ranging from 1,000 to 1,000,000 and the weight ratio of the silicate to the polymer ranges from 1.5:1 to 10:1.

5. The method of claim 3 wherein the montmorillonite is sodium montmorillonite.

6. The method of claim 1 wherein said polymer is selected from the group consisting of vinyl polymers, polyalkylene oxides, polyesters, vinylidene polymers, fluoropolymers, polysiloxanes, polyphenylene sulfides, polyacetals, polycarbonates, polysulfones, polyether sulfones, phenolic resins, epoxy resins, alkyd resins, furan resins, urea resins, melamine resins, polyurethane resins and aniline resins.

7. The method of claim 6 wherein the reaction of step (b) is effected by heating said admixture in air or vacuum at above the melting or glass transition temperature of the polymer.

8. The method of claim 7 wherein the weight ratio of the silicate to the polymer ranges from 1.5:1 to 10:1.

9. The method of claim 1 wherein said polymer is selected from the group consisting of vinyl polymers and polyoxyalkylene oxides.

10. The method of claim 9 wherein the reaction of step (b) is effected by heating said admixture in air or vacuum at above the melting or glass transition temperature of the polymer.

11. The method of claim 10 wherein the weight ratio of the silicate to the polymer ranges from 1.5:1 to 10:1.

12. The method of claim 1 wherein the weight ratio of the silicate to the polymer ranges from 1.5:1 to 10:1.

13. The method of claim 12 wherein the reaction of step (b) is effected by heating said admixture in air or vacuum at above the melting or glass transition temperature of the polymer.

* * * * *